United States Patent
Chou et al.

(10) Patent No.: US 8,736,572 B2
(45) Date of Patent: May 27, 2014

(54) TOUCH INPUT DEVICE AND TOUCH SENSOR CIRCUIT

(75) Inventors: Shih-Tzung Chou, Hsinchu County (TW); Yu Kuang, Hsinchu (TW); Zong-Lin Wu, Sanchong (TW); Yong-Nien Rao, Hsinchu (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 669 days.

(21) Appl. No.: 12/817,274

(22) Filed: Jun. 17, 2010

(65) Prior Publication Data

US 2010/0321336 A1    Dec. 23, 2010

(30) Foreign Application Priority Data

Jun. 18, 2009   (TW) ................................ 98120430 A

(51) Int. Cl.
  *G06F 3/045*    (2006.01)
(52) U.S. Cl.
  USPC .......................................................... 345/174
(58) Field of Classification Search
  USPC .......................................................... 345/174
  See application file for complete search history.

(56) References Cited

U.S. PATENT DOCUMENTS

| | | | | |
|---|---|---|---|---|
| 5,798,756 | A * | 8/1998 | Yoshida et al. | 345/179 |
| 5,825,352 | A * | 10/1998 | Bisset et al. | 345/173 |
| 6,297,811 | B1 * | 10/2001 | Kent et al. | 345/173 |
| 8,232,972 | B2 | 7/2012 | Huang et al. | |
| 2007/0260272 | A1 * | 11/2007 | Weiss et al. | 606/181 |
| 2008/0162996 | A1 | 7/2008 | Krah et al. | |
| 2009/0009486 | A1 * | 1/2009 | Sato et al. | 345/174 |
| 2009/0127005 | A1 * | 5/2009 | Zachut et al. | 178/18.03 |
| 2010/0097328 | A1 * | 4/2010 | Simmons et al. | 345/173 |
| 2010/0117981 | A1 * | 5/2010 | Chen et al. | 345/174 |

FOREIGN PATENT DOCUMENTS

| | | |
|---|---|---|
| TW | 200802058 A | 1/2008 |
| TW | 200905538 A | 2/2009 |
| TW | 200912439 A | 3/2009 |
| TW | I273497 A | 3/2009 |

* cited by examiner

*Primary Examiner* — Alexander S Beck
*Assistant Examiner* — Mihir Rayan

(57) ABSTRACT

The invention discloses a touch input device and a touch sensor circuit. The touch input device includes a touch panel, a selection module and a differential detection module. The touch panel includes a plurality of capacitive nodes thereon. The selection module is electrically connected with the capacitive nodes of the touch panel. The selection module selects a first capacitive node and a second capacitive node from the capacitive nodes. The second capacitive node is close to the first capacitive node. The differential detection module, electrically connected to the selection module, is used for detecting a capacitance difference between the first capacitive node and the second capacitive node. According to the capacitance difference, the differential detection module generates a touch detection signal.

12 Claims, 2 Drawing Sheets

TOUCH INPUT DEVICE AND TOUCH SENSOR CIRCUIT

BACKGROUND OF THE INVENTION

1. Field of the Invention

The invention relates to a touch input device and a touch sensor circuit, and more particularly to a touch input device and a touch sensor circuit with differential detection.

2. Description of the Prior Art

With the development of information technology, the electronic products become more diversified and humanized. For example, based on the touch panel or touch pad nowadays, user may simply operate the device or type some sentences with their finger or a touch pen, instead of using the mouse or keyboard to type in the traditional and inconvenient way.

There are a number of types of touch panel technology: resistive type, capacitive type, optical type and surface acoustic wave type. The resistive-typed touch panel mainly includes upper and lower ITO glass layers. When an object touches the upper ITO glass layer and presses it toward the lower ITO glass layer, the controller of the touch panel will generate a voltage signal, and coordinates of the contact point can be computed according to the voltage signal.

The capacitive-typed touch panel has two types: surface capacitive touch panel and projected capacitive touch panel. The surface capacitive touch panel includes a piece of conductive glass. Two surfaces of the conductive glass are coated with conductive material. External surfaces of the conductive glass are further coated with a protective film. The electrodes around the glass plate builds up an electric flied on the glass surfaces. When users touch the touch panel with their fingers, the fingers will be coupled to the capacitance on the glass surface and induce a small current. The controller of the touch panel may compute the coordinates of the contact point according to the current.

Recently, the projected capacitive touch panels are widely applied in various touch-input electronic devices (e.g. smart phones). The locating theory of the projected capacitive touch panel is based on the capacitive variation of the sensor grid implemented within the touch panel. Please refer to FIG. 1, FIG. 1 is a schematic diagram illustrating a touch panel 10 in prior art. As shown in FIG. 1, there are multiple X-directional conductive lines (X1~Xm) and multiple Y-directional conductive lines (Y1~Yn) disposed on different layers in the touch panel 10. The X-directional conductive lines and the Y-directional conductive lines are cross to form the sensor grid. Each cross point of one X-directional conductive line and Y-directional conductive line is one capacitive node (e.g. the capacitive nodes 100a, 100b and 100c in FIG. 1). In this case of FIG. 1, there are m*n capacitive nodes totally. The coupling relationship between finger and sensor grid may change the capacitance values of adjacent capacitive nodes. The detection circuit may compute the coordinate of the contact point according to the capacitive variation of the capacitive nodes on the sensor grid.

Please refer to FIG. 2. FIG. 2 is a schematic diagram illustrating a touch input device 1 and a touch sensor circuit 12 in prior art. As shown in FIG. 2, the touch input device in prior art includes a touch panel 10 and the touch sensor circuit 12 for cooperating with the panel. The touch sensor circuit 12 may include a multiplexer 120, a controller circuit 1200, a differential detection module 122 and a reference capacitor array 124. In practical circuit, the differential detection module 122 can be a comparator circuit, and the reference capacitor array 124 can be formed by multiple capacitors arranged in a specific way. Each capacitor in the reference capacitor array 124 represents a reference capacitance corresponding to a different location on the touch panel 10.

On different spot of the capacitive touch panel, each capacitive node may have different intrinsic capacitance value, which is affected by material and thickness of substrate, coupling to surrounding area and distance to the frame of the touch panel. Serious distortion will happen if all capacitive nodes are compared to one identical reference value. For example, the intrinsic capacitance value of the capacitive node around the edges may be quite different from one of the capacitive node in the middle. Therefore, different reference capacitance values are needed relative to those capacitive nodes.

In practical applications, the controller circuit 1200 may control the multiplexer 120 and utilize it to select a specific X-directional conductive line (X1~Xm) and a specific Y-directional conductive line (Y1~Yn), so as to select one specific capacitive node. For example, the multiplexer 120 may select X-directional conductive line X3 and Y-directional conductive line Y3 for corresponding to the capacitive node 100a. Then, the differential module 122 may compare the capacitance value of the capacitive node 100a with the reference capacitor array 124. In this embodiment, the reference capacitor array 124 is used for providing the intrinsic capacitance value of the capacitive nodes on the touch panel 10. In this way, the reference capacitor array 124 needs many fixed capacitors with different capacitance values. In order to match all the capacitive nodes, it may need m*n fixed capacitors with different capacitance values at most.

On the other hand, the capacitance value of the reference capacitor array 124 must be similar to the capacitive node under estimated. For example, the capacitive nodes 100a, 100b and 100c may be 10 pF, 11 pF and 12 pF. In this case, the capacitance value of the reference capacitor array 124 must implement an array from 10 pF to 12 pF. However, to dispose a capacitor over 10 pF in an integrated circuit may bring high cost and occupy large area.

Besides, in order to elevate the touch-input preciseness on the touch panel, the total amount of capacitive nodes (m*n) contained in one singular touch panel 10 increases gradually. To implement a huge reference capacitor array 124 into the touch input device 1 is not an ideal solution for a modern application. In addition, the intrinsic capacitance value is larger in a large sized touch panel, such that the reference capacitor array 124 with higher capacitance values is required in traditional design.

Therefore, the invention discloses a touch input device and a touch sensor circuit, which is suitable for various touch input electronic system, so as to solve said problems.

SUMMARY OF THE INVENTION

A scope of the invention is to provide a touch input device, which includes a touch panel, a selection module and a differential detection module.

According to an embodiment, the touch panel includes a plurality of capacitive nodes. The capacitive nodes are formed and spread on the touch panel. The selection module is electrically connected with the capacitive nodes of the touch panel. The selection module selects a first capacitive node and a second capacitive node from the capacitive nodes. The second capacitive node is adjacent to the first capacitive node. The differential detection module is electrically connected with the selection module. The different detection module detects a capacitance difference between the first capacitive node and the second capacitive node selected by the selection module, so as to generate a touch detection signal.

Another scope of the invention is to provide a touch input device, which includes a touch panel, a selection module and a differential detection module.

According to an embodiment, the touch panel includes a plurality of capacitive nodes. The capacitive nodes are formed and spread on the touch panel. The selection module is electrically connected with the capacitive nodes of the touch panel. The selection module selects some capacitive nodes from the plurality of capacitive nodes to form a first capacitive node set, and it also selects some capacitive nodes from the plurality of capacitive nodes to form a second capacitive node set. The capacitive nodes of the second capacitive node set are adjacent to the capacitive nodes of the first capacitive node set. The differential detection module is electrically connected with the selection module. The different detection module detects a total capacitance difference between the first capacitive node set and the second capacitive node set selected by the selection module, so as to generate a touch detection signal.

Another scope of the invention is to provide a touch sensor circuit suitable for a touch panel. A plurality of capacitive nodes are formed and spread on the touch panel.

According to an embodiment, the touch sensor circuit includes a selection module and a differential detection module. The selection module is electrically connected with the capacitive nodes of the touch panel. The selection module selects a first capacitive node and a second capacitive node from the capacitive nodes. The second capacitive node is adjacent to the first capacitive node. The differential detection module is electrically connected with the selection module. The different detection module detects a capacitance difference between the first capacitive node and the second capacitive node selected by the selection module, so as to generate a touch detection signal.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
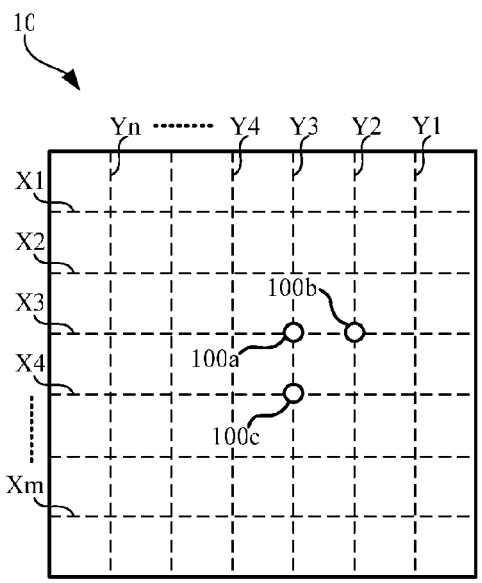
FIG. 1 is a schematic diagram illustrating a touch panel in prior art.
Figure 2:
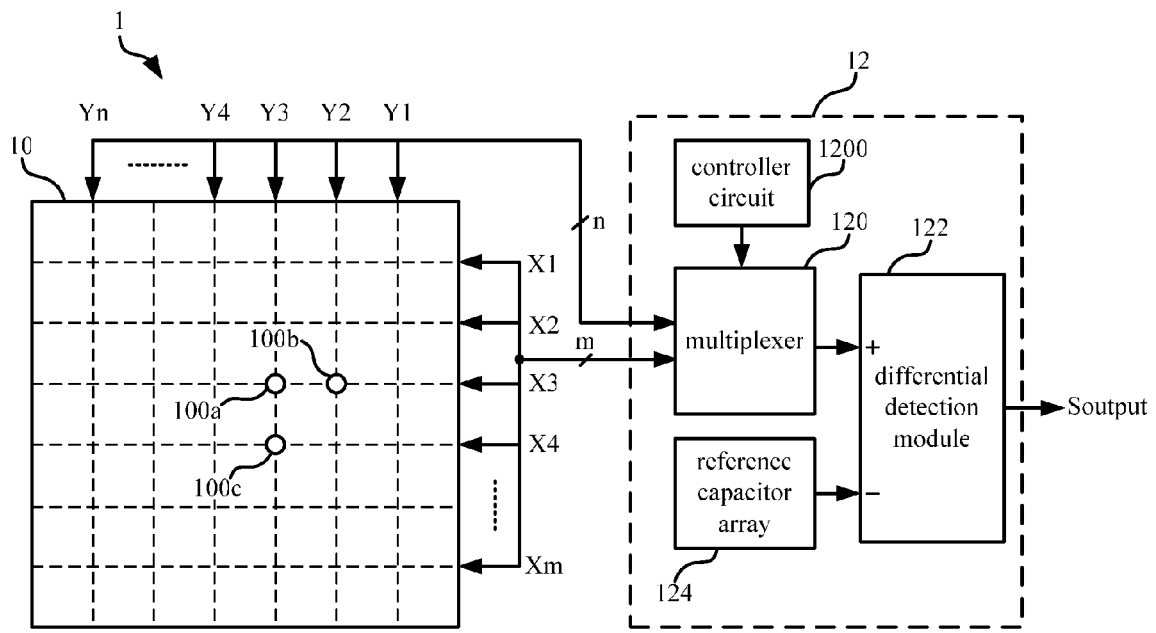
FIG. 2 is a schematic diagram illustrating a touch input device and a touch sensor circuit in prior art.
Figure 3:
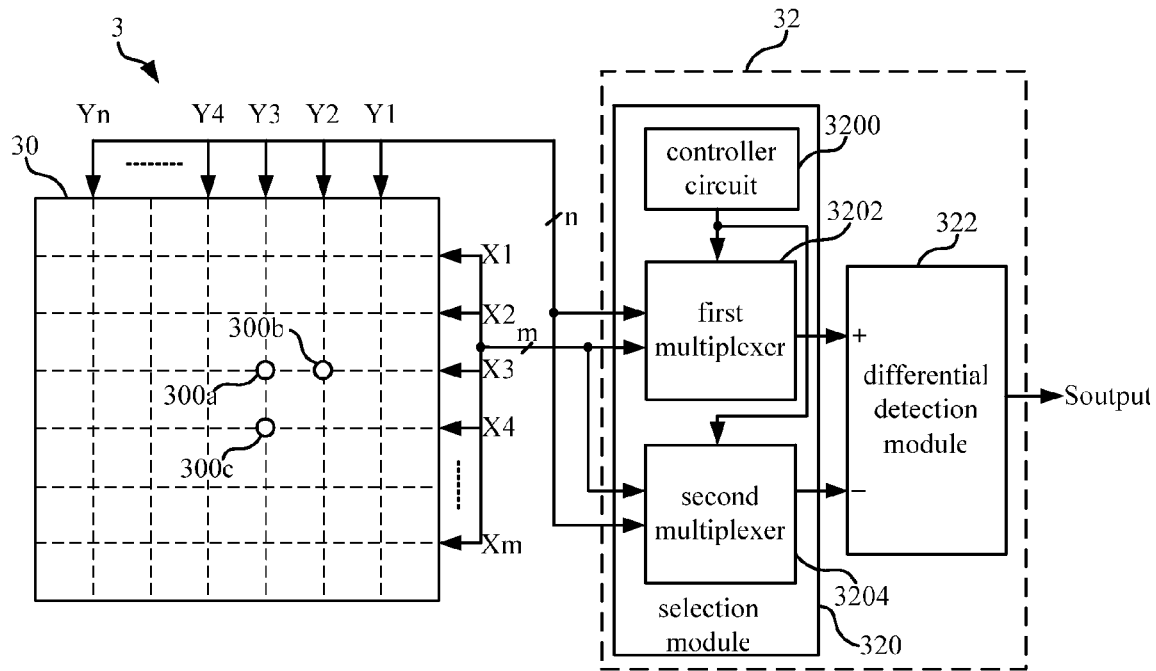
FIG. 3 is a schematic diagram illustrating a touch input device according to a first embodiment of the invention.

Please refer to FIG. 3. FIG. 3 is a schematic diagram illustrating a touch input device 3 according to a first embodiment of the invention. The touch input device 3 includes a touch panel 30 and a corresponding touch sensor circuit 32. In this embodiment, the touch sensor circuit 32 can be produced independently and be widely applied in various electronic systems with touch input function. In other words, the touch sensor circuit 32 is not limited to be implemented in the touch input device 3 of the embodiment.

In this embodiment, the touch panel 30 includes a plurality of X-directional conductive lines (X1~Xm) and a plurality of Y-directional conductive lines (Y1~Yn). The X-directional conductive lines and the Y-directional conductive lines are arranged in a grid shape. As shown in FIG. 3, the X-directional conductive lines are disposed in parallel direction, and the Y-directional conductive lines are disposed in vertical direction, such that to form an intersectional grid shape. However, the invention is not limited to this kind of wiring arrangement. In other embodiment, the lines can be arranged into different direction or angle. Besides, there is one capacitive node formed on each intersectional point the X-directional conductive lines and one of the Y-directional conductive lines (please refer to capacitive nodes 300a, 300b and 300c in FIG. 3). In other words, the touch panel 30 includes a plurality of capacitive nodes formed and spread on the touch panel 30. The capacitive nodes correspond to one of the X-directional conductive lines and one of the Y-directional conductive lines respectively. For example, the capacitive node 300a corresponds to the X-directional conductive line X3 and the Y-directional conductive line Y3; the capacitive node 300b corresponds to the X-directional conductive line X3 and the Y-directional conductive line Y2. In practical applications, the touch panel can be a projected capacitive touch panel or other equivalent capacitive touch panel.

As shown in FIG. 3, the touch sensor circuit 32 includes a selection module 320 and a differential detection module 322. The selection module 320 is electrically connected with the capacitive nodes of the touch panel 30. The differential detection module 322 is electrically connected with the selection module 320.

In this embodiment, the selection module 320 further includes a first multiplexer 3202 and a second multiplexer 3204 and a controller circuit 3200 for controlling aforesaid multiplexers. The first multiplexer 3202 and the second multiplexer 3204 are coupled between the touch panel 30 and the differential detection module 322. The first multiplexer 3202 and the second multiplexer 3204 are electrically connected with the X-directional conductive lines (X1~Xm) and the Y-directional conductive lines (Y1~Yn) respectively.

The selection module 320 utilizes the controller circuit 3200 for controlling the first multiplexer 3202 to select one X-directional conductive line from the X-directional conductive lines (X1~Xm) and select one Y-directional conductive line from the Y-directional conductive lines (Y1~Yn), so as to select one capacitive node (the first capacitive node in this case). Besides, the selection module 320 utilizes the controller circuit 3200 for controlling the second multiplexer 3204 to select another capacitive node (the second capacitive node in this case). The differential detection module 322 can detect a capacitance difference between the first capacitive node and the second capacitive node selected by the selection module 320, so as to generate a touch detection signal S output.

In practical applications, the differential detection module 322 may includes a capacitance measuring unit and a comparer unit, such that the differential detection module 322 is capable of measuring and comparing the capacitance difference between the capacitive nodes.

An operational example is listed in the following paragraphs for demonstration. The first multiplexer 3202 may select the X-directional conductive line X3 and the Y-directional conductive line Y3 for picking up the capacitive node 300a. In the mean time, the second multiplexer 3204 may select the X-directional conductive line X3 and the Y-directional conductive line Y2 for picking up the capacitive node 300b.

In this operational example, the differential detection module 322 may calculate the capacitance difference between the capacitive node 300a and the capacitive node 300b. If there is an object makes a contact on the location of the capacitive node 300a, the capacitance value of the capacitive node 300a will vary. In this case, the touch sensor circuit 32 may detect the capacitance difference between the capacitive node 300a and one adjacent capacitive node (the capacitive node 300b), so as to acknowledge the contact on the capacitive node 300a.

To be notice that, the second capacitive node (the capacitive node 300b in this case) selected by the second multiplexer 3204 of the selection module 320 is designed to be located around the first capacitive node (the capacitive node 300a in this case) selected by the first multiplexer 3202 of the selection module 320. Accordingly, the capacitance value of the second capacitive node can be equivalently served as judgmental reference for judging whether the first capacitive node is touched or not. In prior art, an extra reference capacitance array is needed to served as judgmental reference for each capacitive node. Compared to the prior art, the invention utilizes the differential relationship between two capacitive nodes to be the judgmental standard in generating the touch detection signal S output. In this way, that the implementation cost and circuit area of the touch sensor circuit 32 in the invention can be reduced, so as to achieve the goal of compact design and low power consumption in modern electronic devices.

Besides, the relative location relationship of the first capacitive node and the second capacitive node is not limited to the parallel-adjacent relationship (such as capacitive nodes 300a and 300b). In another operational example, it may select the capacitive nodes 300a and 300c, which are vertical-adjacent. The selected vertical pair can be also detected by the differential detection module 322, to achieve similar function in aforesaid paragraphs.

The following Table 1 illustrating an operational example about the selection module 320 selecting the X-directional and Y-directional conductive lines in one detection procedure with fixed Y and varied X (wherein k is an integer between 1~n).

TABLE 1

|  | time | | | | |
| --- | --- | --- | --- | --- | --- |
|  | 1 | 2 | 3 | ... | m − 1 |
| first multiplexer | X1, Yk | X2, Yk | X3, Yk | ... | Xm − 1, Yk |
| second multiplexer | X2, Yk | X3, Yk | X4, Yk | ... | Xm, Yk |

In the procedure of Table 1, every two adjacent capacitive nodes on one specific Y-directional conductive line (Yk) can be measured in the differential way in a detection period.

In another case, the following Table 2 illustrating an operational example about the selection module 320 selecting the X-directional and Y-directional conductive lines in one detection procedure with fixed X and varied Y (wherein k is an integer between 1~m).

TABLE 2

|  | time | | | | |
| --- | --- | --- | --- | --- | --- |
|  | 1 | 2 | 3 | ... | n − 1 |
| first multiplexer | Xk, Y1 | Xk, Y2 | Xk, Y3 | ... | Xk, Yn − 1 |
| second multiplexer | Xk, Y2 | Xk, Y3 | Xk, Y4 | ... | Xk, Yn |

Figure 4:
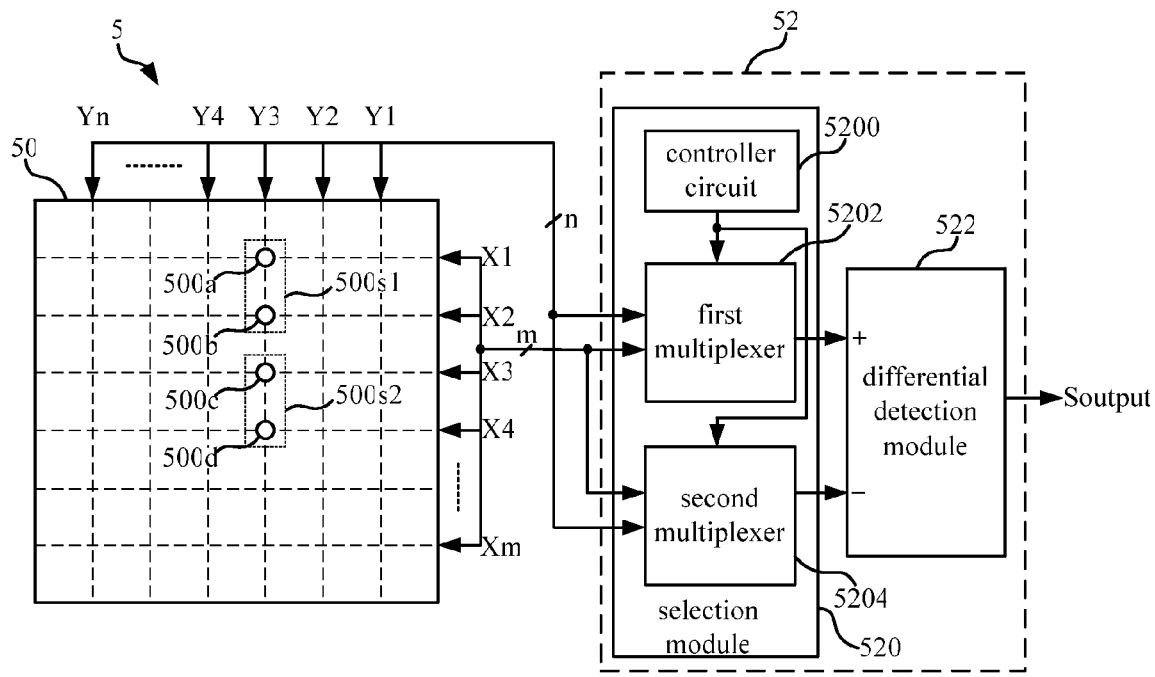
FIG. 4 is a schematic diagram illustrating a touch input device according to a second embodiment of the invention.

Please refer to FIG. 4. FIG. 4 is a schematic diagram illustrating a touch input device 5 according to a second embodiment of the invention. Compare with the first embodiment in aforesaid paragraphs, the major difference of the touch input device 5 in the second embodiment is that the selection module 520 selects multiple capacitive nodes from all capacitive nodes on the touch panel 50 to form a first capacitive node set, and in the mean time, it selects multiple capacitive nodes from all capacitive nodes on the touch panel 50 to form a second capacitive node set. Besides, the capacitive nodes of the second capacitive node set are adjacent to the capacitive nodes of the first capacitive node set.

In another operational example, the selection module 520 of the touch input device 5 utilizes the first multiplexer 5202 to select two X-directional conductive lines (X1, X2) from the X-directional conductive lines and select one Y-directional conductive line (Y3) from the Y-directional conductive lines, so as to select two capacitive nodes (such as the capacitive nodes 500a and 500b in FIG. 4) for forming the first capacitive node set 500s1. On the other hand, the selection module 520 utilizes the second multiplexer 5204 to select two X-directional conductive lines (X3, X4) from the X-directional conductive lines and select one Y-directional conductive line (Y3) from the Y-directional conductive lines, so as to select two capacitive nodes (such as the capacitive nodes 500c and 500d in FIG. 4) for forming the second capacitive node set 500s2. The capacitive nodes of the second capacitive node set 500s2 are adjacent to the capacitive nodes of the first capacitive node set 500s1.

The differential detection module 522 detects a total capacitance difference between the first capacitive node set 500s1 and the second capacitive node set 500s2 selected by the selection module 520, and then the differential detection module 522 may perform the following touch judgmental process according to the total capacitance difference.

When the differential detection module 522 detects the total capacitance difference between the first capacitive node set 500s1 and the second capacitive node set 500s2, the touch input device 5 may further distinguish which capacitive node of the capacitive nodes in the capacitive node set 500s1 is the optimal one for corresponding to the external contact.

The selection module 520 further selects any two capacitive nodes from the capacitive nodes of the first capacitive node set 500s1. The selection and detection between any two capacitive nodes is disclosed in the first embodiment, so not to be repeated here again. Then, the differential detection module 522 further detects a capacitance difference between any two capacitive nodes within the first capacitive node set 500s1, so as to generate the touch detection signal.

The following Table 3 and Table 4 illustrating an operational example about the selection module 520 selecting the X-directional and Y-directional conductive lines in one detection procedure with fixed Y and varied X (wherein k is an integer between 1~n, and m is a multiple of 2).

TABLE 3

|  | time | | | | |
| --- | --- | --- | --- | --- | --- |
|  | 1 | 2 | 3 | ... | (m/2) − 1 |
| first multiplexer | X1 + X2, Yk | X3 + X4, Yk | X5 + X6, Yk | ... | Xm − 3 + Xm − 2, Yk |
| second multiplexer | X3 + X4, Yk | X5 + X6, Yk | X7 + X8, Yk | ... | Xm − 1 + Xm, Yk |

As shown in FIG. 3, the touch input device 5 of the invention selects two X-directional conductive lines at a time, such that the cycle time period of one detection process can be reduced to ½ as long as the original process. As shown in the Table 3, the period for one detection process is reduced to (m/2)−1. In other words, the invention may reduce the detection period.

Then, the candidate capacitive node sets detected by the process in Table 3 are going through second round detection shown in Table 4. For example, when the set of (X2t+X2t+1, Yk) and the set of (X2t+1+X2t+2, Yk) are detected for having the largest capacitance difference in the process of Table 3.

TABLE 4

|  | time | | |
| --- | --- | --- | --- |
|  | 1 | 2 | 3 |
| first multiplexer | X2t − 1, Yk | X2t, Yk | X2t + 1, Yk |
| second multiplexer | X2t, Yk | X2t + 1, Yk | X2t + 2, Yk |

The touch input device 5 in the second embodiment may go through two stages of detection shown in Table 3 and Table 4, so as to generate the touch detection signal S output corresponding to the external touch contact. Other components and detail detection flow of the touch input device 5 in the second embodiment is similar to the first embodiment, so not to be repeated again.

Besides, the relative location relationship of the first capacitive node set and the second capacitive node set in the touch input device 5 is not limited to the vertical-adjacent relationship (such as capacitive nodes 500a, 500b and capacitive nodes 500c, 500d shown in FIG. 4). In another operational example, each capacitive node set may contain several capacitive node arranged in parallel-adjacent, in round shape, in rectangular shape or in any equivalent pattern. Besides, the total amount of capacitive nodes is not limited to two in one capacitive node set, and one set may contain three or at least three capacitive nodes, so as to achieve the equivalent or even faster detection speed.

To be noticed that, when the multiplexers in the selection module 520 select conductive lines, it is not limited to select one Y-directional conductive line and two X-directional conductive lines. The selection module 520 may selects one X-directional conductive line with at least two Y-directional conductive lines, at least two X-directional conductive lines with one Y-directional conductive line, or at least two X-directional conductive lines with at least two Y-directional conductive lines, so as to form different selection modes for the capacitive node set.

In another operational example, the first multiplexer 5202 may select a first X-directional conductive line (such as X3) from the X-directional conductive lines (X1~Xm) and make all Y-directional conductive lines (Y1~Yn) grounded or floating, so as to select all capacitive nodes corresponding to the first X-directional conductive line (all nodes on X3 axis) and form the first capacitive node set. The second multiplexer may select a first X-directional conductive line (such as X4) from the X-directional conductive lines (X1~Xm) and make all Y-directional conductive lines (Y1~Yn) grounded or floating, so as to select all capacitive nodes corresponding to the second X-directional conductive line (all nodes on X4 axis) and form the second capacitive node set.

Or in another operational example, the first multiplexer 5202 may select a first Y-directional conductive line from the Y-directional conductive lines and make all X-directional conductive lines (X1~Xm) grounded or floating, so as to select all capacitive nodes corresponding to the first Y-directional conductive line and form the first capacitive node set. The second multiplexer may select a first Y-directional conductive line from the Y-directional conductive lines and make all X-directional conductive lines (X1~Xm) grounded or floating, so as to select all capacitive nodes corresponding to the second Y-directional conductive line and form the second capacitive node set.

Compared with prior art, the invention utilizes the differential relationship between adjacent capacitive nodes or adjacent capacitive node sets to serve as the judgmental reference in generating the touch detection signal. In this way, that the implementation cost and circuit area of the touch sensor circuit can be reduced and the detection process can be speeded up, so as to achieve the goal of compact design and low power consumption in modern electronic devices.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:
1. A touch input device, comprising:
a touch panel comprising:
a plurality of X-directional conductive lines;
a plurality of Y-directional conductive lines; and
a plurality of capacitive nodes formed and spread on the X-directional conductive lines and the Y-directional conductive lines of the touch panel;
a selection module electrically connected with the capacitive nodes of the touch panel, the selection module sequentially selecting pairs of a first capacitive node and a second capacitive node from the capacitive nodes of a same X-directional conductive line or a same Y-directional conductive line, the second capacitive node being adjacent to the first capacitive node in the same pair, wherein the selection module comprises:
a first multiplexer being electrically connected with the X-directional conductive lines and the Y-directional conductive lines, the selection module utilizing the first multiplexer to select one X-directional conductive line from the X-directional conductive lines and select one Y-directional conductive line from the Y-directional conductive lines, so as to select the first capacitive node; and
a second multiplexer being electrically connected with the X-directional conductive lines and the Y-directional conductive lines, the selection module utilizing the second multiplexer to select one X-directional conductive line from the X-directional conductive lines and select one Y-directional conductive line from the Y-directional conductive lines, so as to select the second capacitive node; and
a differential detection module electrically connected with the selection module, the first multiplexer coupled between the touch panel and the differential detection module, the second multiplexer coupled between the touch panel and the differential detection module, the differential detection module detecting a capacitance difference between the first capacitive node and the second capacitive node selected by the selection module, so as to generate a touch detection signal.
2. The touch input device of claim 1, wherein the touch panel is a projected capacitive touch panel.

3. The touch input device of claim 1, wherein the X-directional conductive lines and the Y-directional conductive lines are arranged in a grid shape, and each of the capacitive nodes is formed corresponding to one of the X-directional conductive lines and one of the Y-directional conductive lines.

4. A touch input device, comprising:
a touch panel comprising:
a plurality of X-directional conductive lines;
a plurality of Y-directional conductive lines; and
a plurality of capacitive nodes formed and spread on the X-directional conductive lines and the Y-directional conductive lines of the touch panel;
a selection module electrically connected with the capacitive nodes of the touch panel, the selection module sequentially selecting some capacitive nodes from the plurality of capacitive nodes of a same X-directional conductive line or a same Y-directional conductive line to form a first capacitive node set and selecting some capacitive nodes from the plurality of capacitive nodes of the same X-directional conductive line or the same Y-directional conductive line to form a second capacitive node set, the capacitive nodes of the second capacitive node set being adjacent to the capacitive nodes of the first capacitive node set; and
a differential detection module electrically connected with the selection module, wherein when the differential detection module detects a total capacitance difference between the first capacitive node set and the second capacitive node set selected by the selection module, the selection module further selects a first capacitive node and a second capacitive node from the capacitive nodes of the first capacitive node set, and the differential detection module further detects a capacitance difference between the first capacitive node and the second capacitive node, so as to generate a touch detection signal.

5. The touch input device of claim 4, wherein the touch panel is a projected capacitive touch panel.

6. The touch input device of claim 4, wherein the X-directional conductive lines and the Y-directional conductive lines are arranged in a grid shape, and each of the capacitive nodes is formed corresponding to one of the X-directional conductive lines and one of the Y-directional conductive lines.

7. The touch input device of claim 6, wherein the selection module comprises:
a first multiplexer coupled between the touch panel and the differential detection module, the first multiplexer being electrically connected with the X-directional conductive lines and the Y-directional conductive lines, the selection module utilizing the first multiplexer to select one X-directional conductive line from the X-directional conductive lines and select at least two Y-directional conductive lines from the Y-directional conductive lines, so as to select and form the first capacitive node set; and
a second multiplexer coupled between the touch panel and the differential detection module, the second multiplexer being electrically connected with the X-directional conductive lines and the Y-directional conductive lines, the selection module utilizing the second multiplexer to select one X-directional conductive line from the X-directional conductive lines and select at least two Y-directional conductive lines from the Y-directional conductive lines, so as to select and form the second capacitive node set.

8. The touch input device of claim 6, wherein the selection module comprises:
a first multiplexer coupled between the touch panel and the differential detection module, the first multiplexer being electrically connected with the X-directional conductive lines and the Y-directional conductive lines, the selection module utilizing the first multiplexer to select at least two X-directional conductive lines from the X-directional conductive lines and select one Y-directional conductive line from the Y-directional conductive lines, so as to select and form the first capacitive node set; and
a second multiplexer coupled between the touch panel and the differential detection module, the second multiplexer being electrically connected with the X-directional conductive lines and the Y-directional conductive lines, the selection module utilizing the second multiplexer to select at least two X-directional conductive lines from the X-directional conductive lines and select one Y-directional conductive line from the Y-directional conductive lines, so as to select and form the second capacitive node set.

9. The touch input device of claim 6, wherein the selection module comprises:
a first multiplexer coupled between the touch panel and the differential detection module, the first multiplexer being electrically connected with the X-directional conductive lines and the Y-directional conductive lines, the selection module utilizing the first multiplexer to select at least two X-directional conductive lines from the X-directional conductive lines and select at least two Y-directional conductive lines from the Y-directional conductive lines, so as to select and form the first capacitive node set; and
a second multiplexer coupled between the touch panel and the differential detection module, the second multiplexer being electrically connected with the X-directional conductive lines and the Y-directional conductive lines, the selection module utilizing the second multiplexer to select at least two X-directional conductive lines from the X-directional conductive lines and select at least two Y-directional conductive lines from the Y-directional conductive lines, so as to select and form the second capacitive node set.

10. The touch input device of claim 6, wherein the selection module comprises:
a first multiplexer coupled between the touch panel and the differential detection module, the first multiplexer being electrically connected with the X-directional conductive lines and the Y-directional conductive lines, the selection module utilizing the first multiplexer to select a first X-directional conductive line from the X-directional conductive lines and make the Y-directional conductive lines grounded or floating, so as to select all capacitive nodes corresponding to the first X-directional conductive line and form the first capacitive node set; and
a second multiplexer coupled between the touch panel and the differential detection module, the second multiplexer being electrically connected with the X-directional conductive lines and the Y-directional conductive lines, the selection module utilizing the second multiplexer to select a first X-directional conductive line from the X-directional conductive lines and make the Y-directional conductive lines grounded or floating, so as to select all capacitive nodes corresponding to the second X-directional conductive line and form the second capacitive node set.

11. The touch input device of claim 6, wherein the selection module comprises:
a first multiplexer coupled between the touch panel and the differential detection module, the first multiplexer being electrically connected with the X-directional conductive lines and the Y-directional conductive lines, the selection module utilizing the first multiplexer to select a first Y-directional conductive line from the Y-directional conductive lines and make the X-directional conductive lines grounded or floating, so as to select all capacitive nodes corresponding to the first Y-directional conductive line and form the first capacitive node set; and a second multiplexer coupled between the touch panel and the differential detection module, the second multiplexer being electrically connected with the X-directional conductive lines and the Y-directional conductive lines, the selection module utilizing the second multiplexer to select a first Y-directional conductive line from the Y-directional conductive lines and make the X-directional conductive lines grounded or floating, so as to select all capacitive nodes corresponding to the second Y-directional conductive line and form the second capacitive node set.

12. A touch sensor circuit, suitable for a touch panel comprising a plurality of X-directional conductive lines, a plurality of Y-directional conductive lines, and a plurality of capacitive nodes being formed and spread on the X-directional conductive lines and the Y-directional conductive lines of the touch panel, the touch sensor circuit comprising:

a selection module electrically connected with the capacitive nodes of the touch panel, the selection module sequentially selecting pairs of a first capacitive node and a second capacitive node from the capacitive nodes of a same X-directional conductive line or a same Y-directional conductive line, the second capacitive node being adjacent to the first capacitive node in the same pair, wherein the selection module comprises:

a first multiplexer being electrically connected with the X-directional conductive lines and the Y-directional conductive lines, the selection module utilizing the first multiplexer to select one X-directional conductive line from the X-directional conductive lines and select one Y-directional conductive line from the Y-directional conductive lines, so as to select the first capacitive node; and a second multiplexer being electrically connected with the X-directional conductive lines and the Y-directional conductive lines, the selection module utilizing the second multiplexer to select one X-directional conductive line from the X-directional conductive lines and select one Y-directional conductive line from the Y-directional conductive lines, so as to select the second capacitive node; and a differential detection module electrically connected with the selection module, the first multiplexer coupled between the touch panel and the differential detection module, the second multiplexer coupled between the touch panel the differential detection module, the differential detection module detecting a capacitance difference between the first capacitive node and the second capacitive node selected by the selection module, so as to generate a touch detection signal.

* * * * *